United States Patent [19]
Onoda et al.

[11] Patent Number: 5,117,502
[45] Date of Patent: May 26, 1992

[54] MOBILE RADIO COMMUNICATION SYSTEM

[75] Inventors: Masahiro Onoda, Sagamihara; Yoshifumi Toda, Tokyo, both of Japan

[73] Assignee: Fujitsu Limited, Kawasaki, Japan

[21] Appl. No.: 669,978

[22] Filed: Mar. 15, 1991

[30] Foreign Application Priority Data

Mar. 19, 1990 [JP] Japan .................................. 2-68918

[51] Int. Cl.⁵ ................................................ H04Q 7/00
[52] U.S. Cl. ...................................... 455/33.1; 379/60
[58] Field of Search ........................ 455/33, 34, 54, 56; 379/59-63; 370/84, 69.1, 121, 85.7, 95.1

[56] References Cited

U.S. PATENT DOCUMENTS

| | | | |
|---|---|---|---|
| 4,754,453 | 6/1988 | Eizenhöfer | 455/33 |
| 4,829,519 | 5/1989 | Scotton et al. | 455/33 |
| 4,918,437 | 4/1990 | Jasinski et al. | 455/33 |
| 4,947,452 | 8/1990 | Hattori et al. | 455/33 |
| 4,955,082 | 9/1990 | Hattori et al. | 370/95.1 |
| 5,008,953 | 4/1991 | Dahlin et al. | 370/95.1 |

*Primary Examiner*—Curtis Kuntz
*Attorney, Agent, or Firm*—Staas & Halsey

[57] ABSTRACT

In a mobile radio communication system, a mobile station constantly monitors a quality of a radio line between the mobile station and a first base station with which the mobile station is presently communicating, detects a deterioration of the quality of the radio line between the mobile station and the first base station outside a tolerable range, successively detects field intensities of signals received from the base stations neighboring the first base station using a free time slot which is unused by the mobile station for communication to determine a maximum field intensity, supplies to the first base station predetermined information related to a second base station from which the signal with the maximum field intensity is received so as to make a handover request, and ends the communication with the first base station in response to a handover message. The first base station supplies a handover request message to a control station in response to the handover request from the mobile station, and the control station carries out a handover process in response to the handover request message. The handover process includes selecting a new communication channel with which the mobile station is to communication with the second base station when the mobile station moves from a first radio zone to a second radio zone, and notifying the handover message and the new communication channel to the mobile station and the first and second base stations, so that the mobile station ends the communication with the first base station in response to the handover message and starts a communication with the second base station using the new communication channel.

13 Claims, 9 Drawing Sheets

MOBILE RADIO COMMUNICATION SYSTEM

BACKGROUND OF THE INVENTION

The present invention generally relates to mobile radio communication systems, and more particularly to a mobile radio communication system which employs a multi-channel access system and is applicable to a mobile telephone or the like using radio zones.

Recently, there are increasing number of users of the mobile radio communication system such as the mobile telephone. Hence, it is desirable that the mobile radio communication system employs a handover control procedure which enables fast and efficient communication, so that the service and the frequency utilization efficiency are improved.

When a mobile station moves in the mobile radio communication system which uses the conventional multi-channel access (FDMA: frequency division multiplexing access) system and employs the radio zones, a handover is made when a called base station changes from an old base station to a new base station. In other words, the base station of an old radio zone in which the mobile station first exists and the base stations in neighboring radio zones measure the field intensity of a signal from the mobile station. A radio zone of the base station which receives the signal from the mobile station with the highest field intensity is regarded as a new radio zone in which the mobile station now exists.

Figure 1:
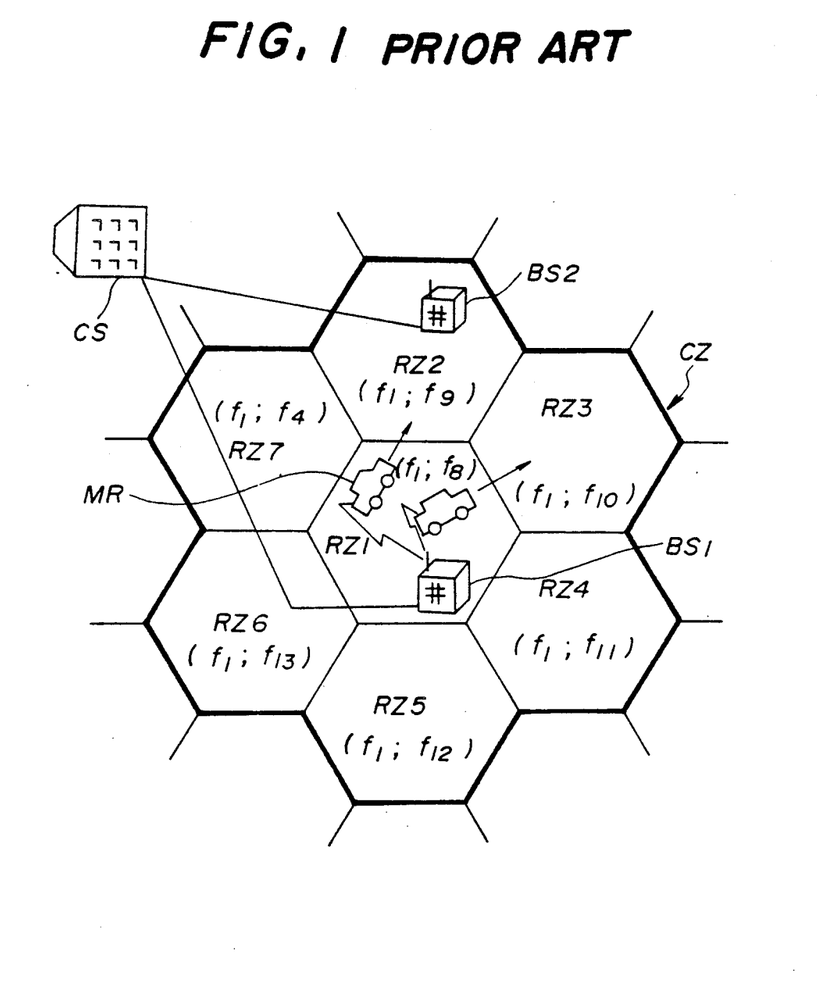
FIG. 1 is a diagram for explaining radio zones.

FIG. 1 shows radio zones of an existing analog mobile telephone as an example of the conventional mobile radio communication system which uses the FDMA system and employs the radio zones. In FIG. 1, a control zone CZ surrounded by a bold solid line includes a plurality of radio zones which are under control of a single control station CS. In this example, the control zone CZ includes seven radio zones RZ1 through RZ7. A base station BSi is provided in each radio zone RZi, where i=1, 2, ..., 7. FIG. 1 only shows a base station BS1 of the radio zone RZ1 and a base station BS2 of the radio zone RZ2. A mobile station MR exists within an arbitrary radio zone RZi within the control zone CZ. The mobile station MR may be a mobile telephone set equipped to an automobile or a portable telephone set which is hand carried by the user.

Figure 2:
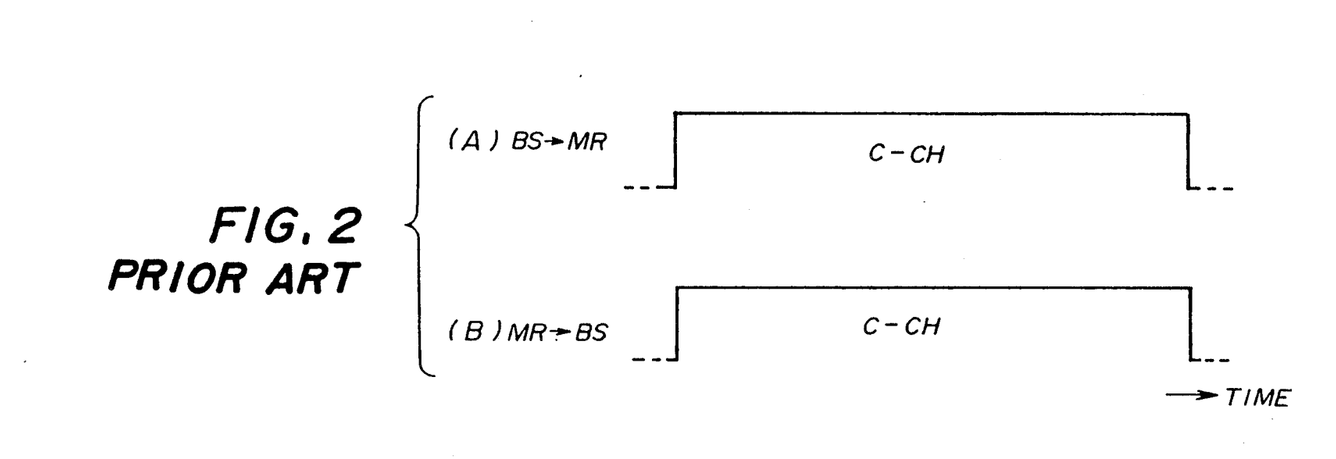
FIGS. 2 and 3 are diagrams for explaining a control signal and a voice signal which are used in the multichannel access system.
Figure 3:
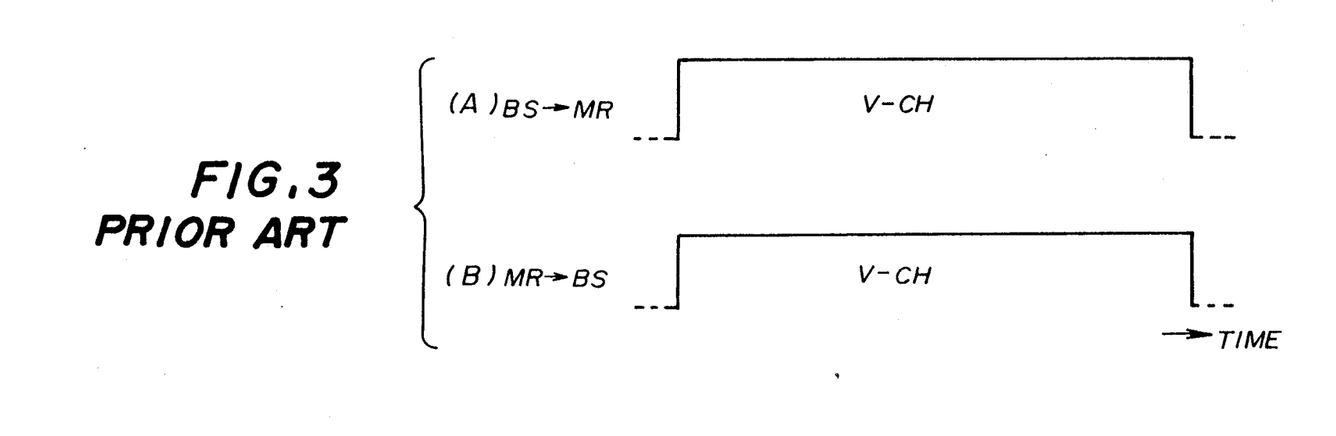

In FIG. 2, (A) and (B) respectively show control signals for controlling call-out and call-in, and in FIG. 3, (A) and (B) respectively show voice signals. As shown in FIGS. 2 and 3, a radio line uses a control channel C-CH and a voice channel V-CH which are not time-division-multiplexed. Hence, there is a going line from the base station BS1 or the like to the mobile station MR, and there is a returning line from the mobile station MR to the base station BS1 or the like.

Moreover, one control channel group f1 is assigned to one control zone CZ, and voice channel groups f8 through f14 are respectively assigned to the radio zones RZ1 through RZ7 so that the frequencies of the voice channels do not overlap among the radio zones RZ1 through RZ7 within the same control zone CZ.

Figure 4:
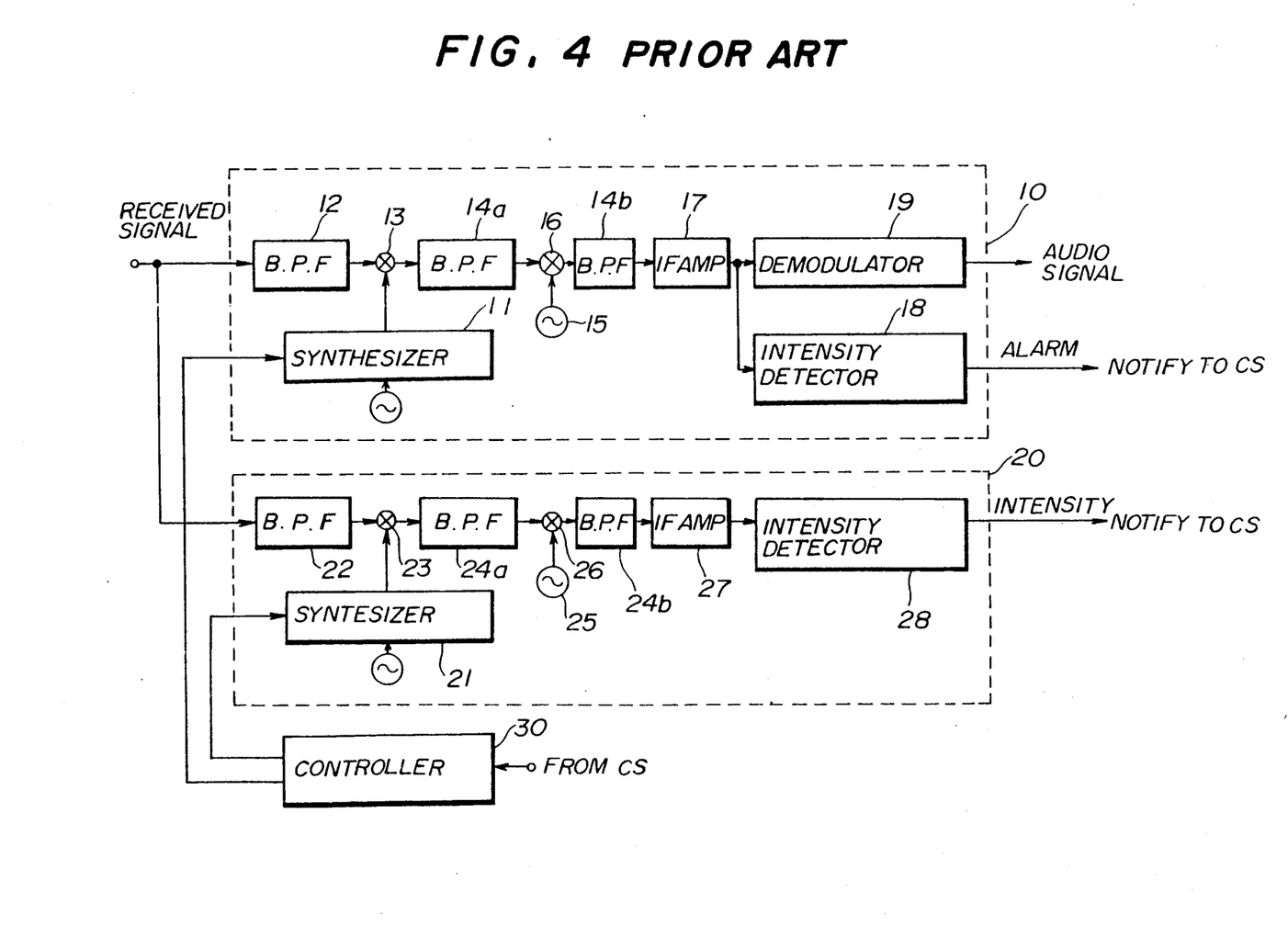
FIG. 4 is a system block diagram showing an example of a receiving system of a base station which is used in a conventional mobile radio communication system.

FIG. 4 shows an example of a receiving system of the base station in the conventional mobile radio communication system. The receiving system includes a receiver 10 for receiving a voice channel signal, a receiver 20 exclusively for measuring the field intensity of a signal from the mobile station RM for the purpose of determining the radio zone in which the mobile station RM is located, and a controller 30 for controlling synthesizers 11 and 21 of the respective receivers 10 and 20 and the channel frequency in response to an instruction from the control station CS.

In the receiver 10, the received signal which passes through a bandpass filter 12 is mixed to a first local signal which has a frequency set by the synthesizer 11 in a mixer 13 and is converted into a signal having a first intermediate frequency. The output signal of the mixer 13 is passed through a bandpass filter 14a and is mixed to a second local signal which has a frequency set by a synthesizer 15 and is converted into a signal having a second intermediate frequency in a mixer 16. The output signal of the mixer 16 is passed through a bandpass filter 14b and is amplified by an intermediate frequency amplifier 17. A field intensity detector 18 detects the field intensity of the received signal based on an output signal of the intermediate frequency amplifier 17 and notifies the detected field intensity to the control station CS. A demodulator 19 demodulates the output signal of the intermediate frequency amplifier 17 and outputs an audio signal.

Similarly, in the receiver 20, the received signal which passes through a bandpass filter 22 is mixed to a first local signal which has a frequency set by the synthesizer 21 in a mixer 23 and is converted into a signal having a first intermediate frequency. The output signal of the mixer 23 is passed through a bandpass filter 24a and is mixed to a second local signal which has a frequency set by a synthesizer 25 and is converted into a signal having a second intermediate frequency in a mixer 26. The output signal of the mixer 26 is passed through a bandpass filter 24b and is amplified by an intermediate frequency amplifier 27. A field intensity detector 28 detects the field intensity of the received signal based on an output signal of the intermediate frequency amplifier 27 and notifies the detected field intensity to the control station CS.

Figure 5:
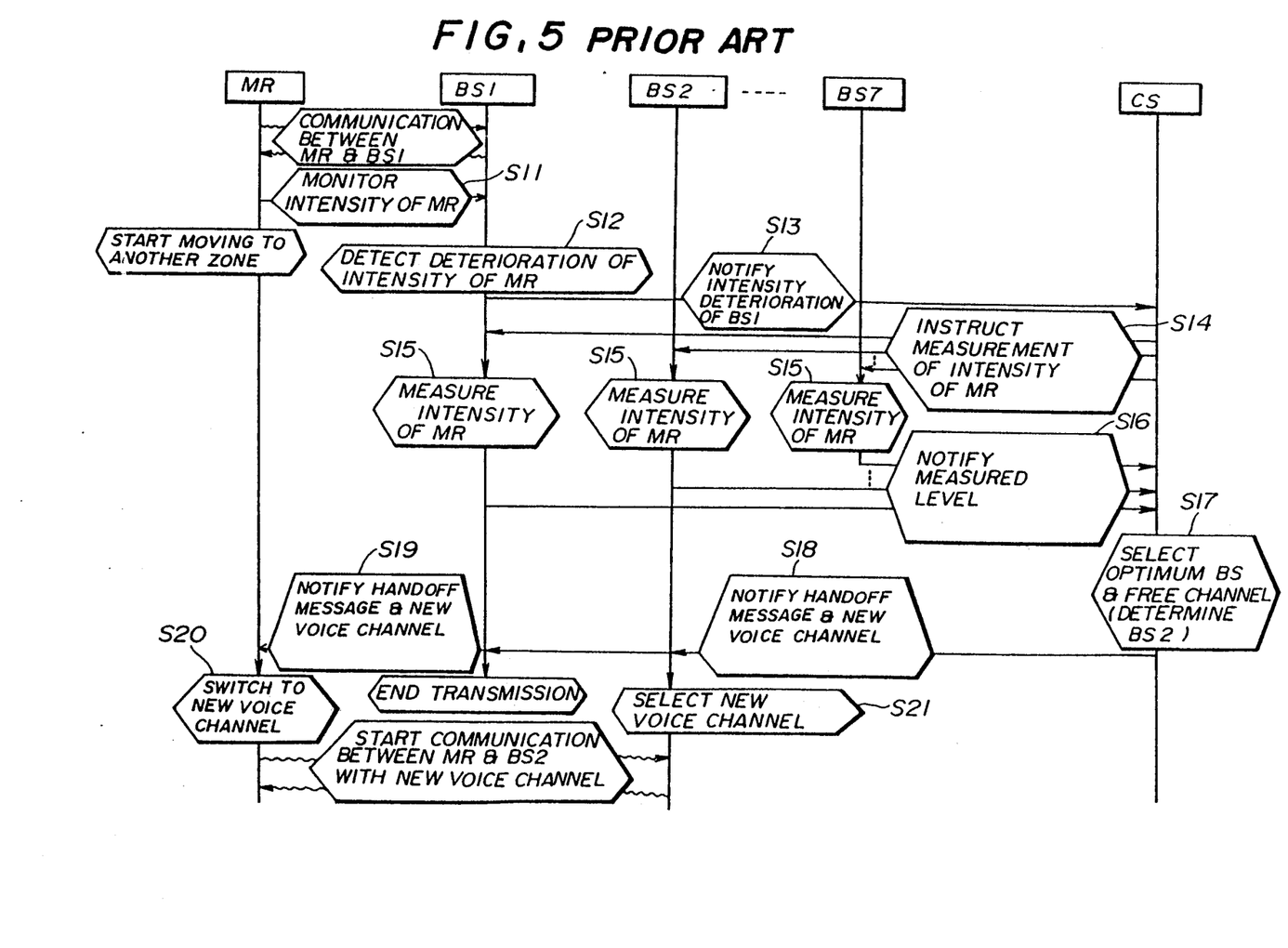
FIGS. 5 is a time chart for explaining an operation of the conventional mobile radio communication system.

FIG. 5 is a time chart for explaining a handover control procedure of the conventional mobile radio communication system which uses the base station shown in FIG. 4. For the sake of convenience, it is assumed that the mobile station MR first exists within the radio zone RZ1 as shown in FIG. 1 and communicates via the base station BS1 of the radio zone RZ1, and that the synthesizer 11 within the receiver 10 is tuned to the frequency of the mobile station MR in response to a frequency control signal from the controller 30 which receives an instruction from the control station CS.

In this case, when the base station BS1 is communicating, the field intensity detector 18 within the receiver 10 constantly monitors the field intensity of the signal from the mobile station MR in a step S11.

When the mobile station MR moves to the end of the radio zone RZ1 and moves from the radio zone RZ1 into the adjacent radio zone RZ2, the field intensity of the signal from the mobile station MR gradually decreases at the base station BS1. When the base station BS1 detects that the field intensity of the signal from the mobile station MR is less than a predetermined threshold value in a step S12, the base station BS1 notifies this information to the control station CS which controls the base station BS1 and the other neighboring base stations BS2 through BS7 within the control zone CZ in a step S13.

Responsive to the information from the base station BS1, the control station CS instructs all of the base stations BS1 through BS7 within the control zone CZ including the base station BS1 to measure the field intensity of the signal received from the mobile station MR in a step S14. The synthesizer 21 of the receiver 20 within each of the base stations BS2 through BS7 is tuned to the frequency of the mobile station MR, so that the field intensity of the signal received from the mobile station MR is output from the field intensity detector 28 within each of the base stations BS2 through BS7 within the control zone CZ in a step S15.

The base stations BS2 through BS7 respectively notify the measured field intensity of the signal received from the mobile station MR to the control station CS in a step S16.

The control station CS compares the field intensities notified from the base stations BS2 through BS7 and selects one of the base stations BS2 through BS7 which outputs the highest field intensity, and at the same time, selects an available channel (or free frequency) out of the voice channel groups f9 through f14 which are assigned to the base stations BS2 through BS7, in a step S17.

When it is assumed for the sake of convenience that the field intensity level notified from the base station BS2 is the highest, the control station CS notifies the base station BS1 of a handoff message and a new voice channel selected from the voice channel group f9 in a step S18 because the mobile station MR has now moved into the radio zone RZ2. This handoff message indicates that the communication between the communicating mobile station MR and the base station BS1 is ending. The base station BS1 transmits the received handoff message and the new voice channel to the mobile station MR and disconnects the transmission on the going line in a step S19.

At the same time, the control station CS notifies the handoff message and the new voice channel to the base station BS2 because the mobile station MR has now moved into the radio zone RZ2. Hence, the base station BS2 is put ready to transmit using the new voice channel.

The mobile station MR switches from the voice channel V-CH which is being used to the new voice channel in a step S20. In addition, the base station BS2 starts a communication with the mobile station MR using the new voice channel of the mobile station MR in a step S21.

Hence, the voice channel between the base station BS2 and the mobile station MR is established in the above described manner.

In the description given above, it is assumed for the sake of convenience that one mobile station MR moves within the control zone CZ. However, in actual practice, a plurality of mobile stations MR exist within the control zone CZ. Since the control zone CZ includes a plurality of radio zones RZ and each radio zone RZ has a radius in the order of several km, many mobile stations MR which require the handover may exist approximately at the same time.

In such a case, because the control station CS of the conventional system monitors the radio zones RZ1 through RZ7 within the control zone CZ, the control station CS cannot process the handovers which are simultaneously generated in a plurality of radio zones RZ within the control zone CZ. In addition, since each base station BS is only provided with a limited number of receivers 10 and 20, the base station BS cannot measure the field intensities of the signals which are simultaneously received from a plurality of mobile stations MR. As a result, there is a problem in that the handover process must wait until the turn of the mobile station MR comes.

Moreover, there is a problem in that the base station BS must be provided with the receiver 20 for measuring the field intensity of the signal from the mobile station MR in addition to the normal receiver 10 which is used for the communication.

SUMMARY OF THE INVENTION

Accordingly, it is a general object of the present invention to provide a novel and useful mobile radio communication system in which the problems described above are eliminated.

Another and more specific object of the present invention is to provide a mobile radio communication system comprising a control station which is provided with respect to a control zone which is made up of a plurality of radio zones, a base station which is provided with respect to each of the radio zones, and a mobile station which is movable within the control zone, where the mobile station includes first means for constantly monitoring a quality of a radio line between the mobile station and a first base station with which the mobile station is presently communicating, the first base station being provided with respect to a first radio zone, second means coupled to the first means for detecting a deterioration of the quality of the radio line outside a tolerable range, third means coupled to the second means for successively detecting field intensities of signals received from the base stations neighboring the first base station using a free time slot which is unused by the mobile station for communication and for determining a maximum field intensity, fourth means coupled to the third means for supplying to the first base station predetermined information related to a second base station from which the signal with the maximum field intensity is received so as to make a handover request, and fifth means for ending a communication with the first base station in response to a handover message, the second base station being provided with respect to a second radio zone which is different from the first radio zone. The first base station includes means for supplying a handover request message to the control station in response to the handover request from the mobile station. The control station includes means for carrying out a handover process in response to the handover request message, the handover process including selecting a new communication channel with which the mobile station is to communicate with the second base station when the mobile station moves from the first radio zone to the second radio zone, and notifying the handover message and the new communication channel to the mobile station and the first and second base stations, so that the mobile station ends the communication with the first base station in response to the handover message and starts a communication with the second base station using the new communication channel. According to the mobile radio communication system of the present invention, it is possible to prevent the mobile station from waiting for the handover even when a plurality of mobile stations within the same control zone simultaneously request handovers. In addition, it is unnecessary to provide in the base station or the mobile station a receiver exclusively for detecting the field intensity for detecting the radio zone of the mobile station. Therefore, it is possible to carry out the handover process at a high speed with a high efficiency so as to enable the communication between the mobile station and the second base station using the new communication channel.

Other objects and further features of the present invention will be apparent from the following detailed description when read in conjunction with the accompanying drawings.

DESCRIPTION OF THE PREFERRED EMBODIMENTS

As shown in FIGS. 2 and 3, both the control signal and the voice signal continuously exist for predetermined time periods according to the conventional mobile radio communication system which uses the multichannel access system. For this reason, the channels are occupied during the predetermined time periods and cannot be used for other purposes.

Figure 6:
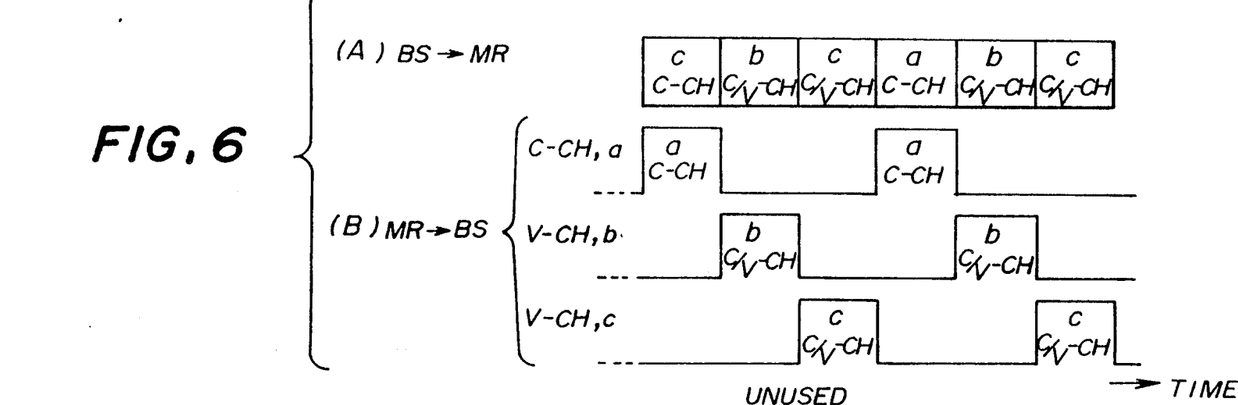
FIGS. 6 and 7 are diagrams for explaining a control signal and a voice signal which are used in the present invention.
Figure 7:
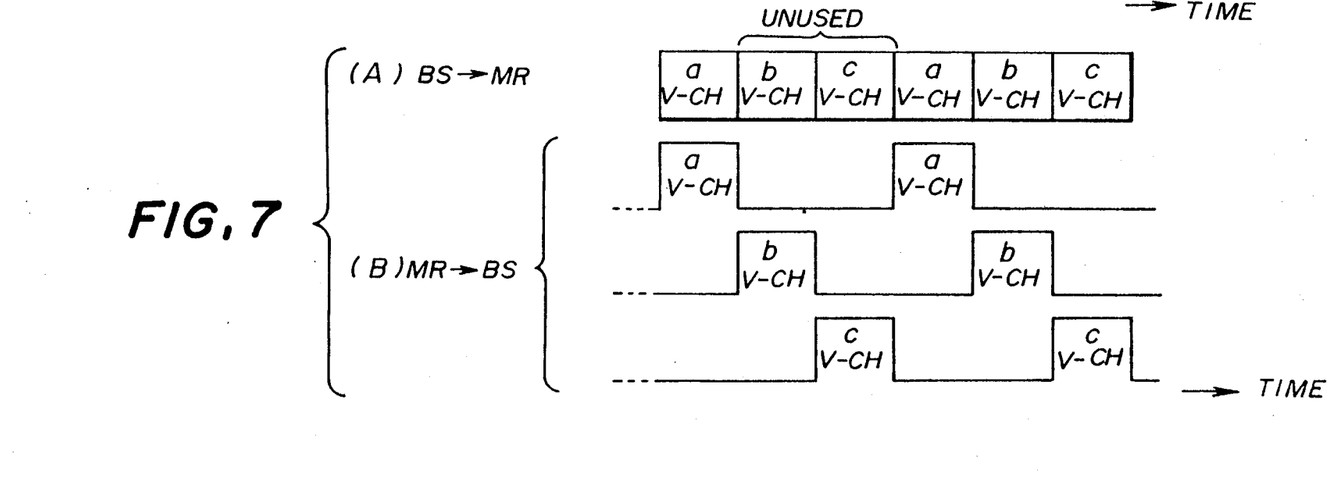

Accordingly, the present invention employs the time division multiplexing access (TDMA) system which time divides both the control signal and the voice signal in time slots as shown in FIGS. 6 and 7. In FIG. 6, (A) and (B) respectively show the control signal transmitted from the base station BS to the mobile station MR and the control signal transmitted from the mobile station MR to the base station BS. In FIG. 7, (A) and (B) respectively show the voice signal transmitted from the base station BS to the mobile station MR and the voice signal transmitted from the mobile station MR to the base station BS.

As shown, both the control signal and the voice signal are constantly transmitted on the going line. But the receiver of a mobile station MR does not receive any information during time slots other than a time slot which is assigned to this mobile station MR. For example, when the time slot "a" is assigned to the mobile station MR, the receiver of this mobile station MR does not receive any information during the time slots "b" and "c".

As shown in FIG. 6, a control channel C-CH is assigned to each radio zone RZ, and the receiving system of the mobile station MR can measure the field intensity of the signals from each of the base stations BS at an arbitrary time by scanning the frequencies of the control signals of the neighboring base stations BS during a time slot other than the time slot used by the mobile station MR. The frequencies of the control signals which are scanned correspond to the frequency groups f1 through f7 of the control signals assigned to each of the radio zones RZ, for example, as will be described later. In addition, the time slot other than the time slot used by the mobile station MR is a free time slot. In FIG. 6, the time slot "a" is used as the control channel C-CH, while the time slots "b" and "c" are used either as the control channel C-CH or the voice channel V-CH (control/voice channel C/V-CH).

Therefore, even when a plurality of mobile stations MR exist within the radio zone RZ, each mobile station MR can measure the field intensity of the signals from each of the base stations BS at an arbitrary time by scanning the frequency groups f8 through f14 of the voice signals during a free time slot other than the time slot of used by the mobile station MR, even when the signals are carriers transmitted from the base stations BS.

Figure 8:
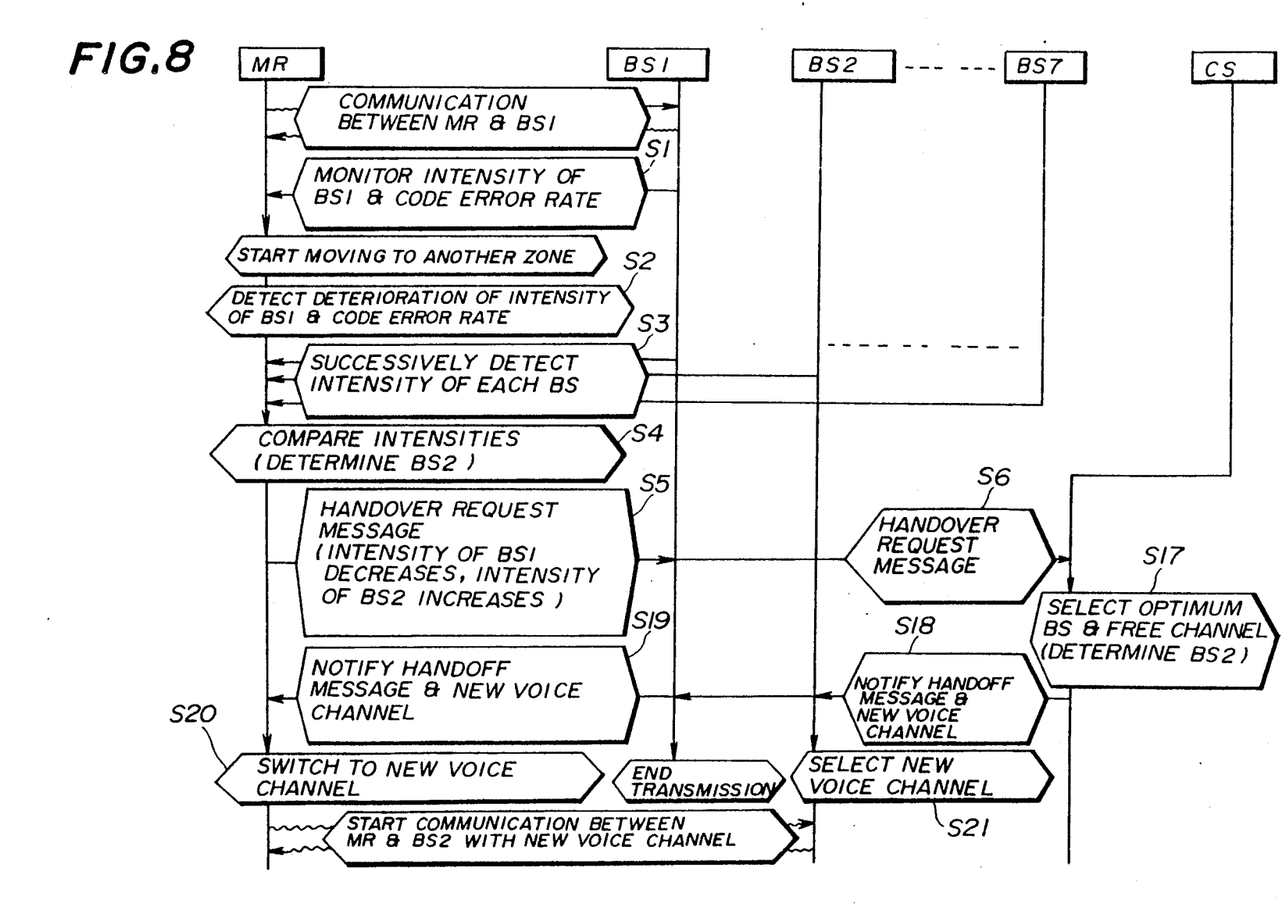
FIG. 8 is a time chart for explaining an operating principle of a mobile radio communication system according to the present invention.
Figure 9:
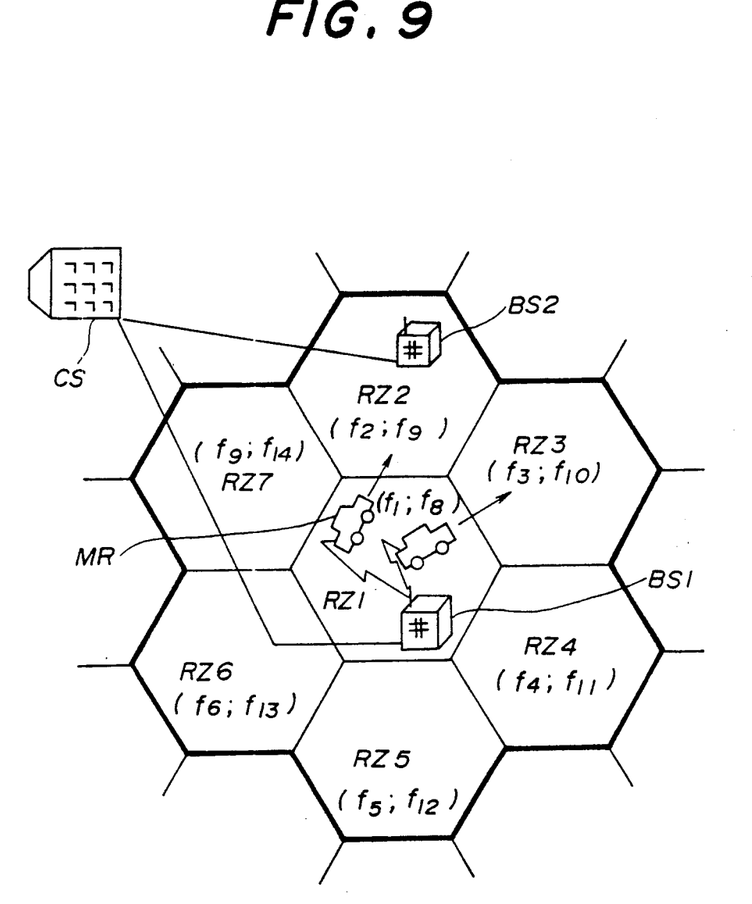
FIG. 9 is a diagram for explaining radio zones employed in the present invention.

A description will now be given of the operating principle of the mobile radio communication system according to the present invention which employs the handover control procedure, by referring to FIGS. 8 and 9. FIG. 8 is a time chart for explaining the operation of the mobile radio communication system according to the present invention, and FIG. 9 shows radio zones employed by the present invention. In FIG. 8, those steps which are the same as those corresponding steps in FIG. 5 are designated by the same reference numerals, and a description thereof will be omitted. Furthermore, in FIG. 9, those parts which are the same as those corresponding parts in FIG. 1 are designated by the same reference numerals, and a description thereof will be omitted. In FIG. 9, frequency groups f1 through f7 are respectively assigned to the control channels C-CH of the radio zones RZ1 through RZ7, and the frequency groups f8 through f14 are respectively assigned to the voice channels V-CH of the radio zones RZ1 through RZ7.

The mobile station MR constantly monitors the quality of the radio line in a step S1 shown in FIG. 8 based on the field intensity of the signal received from the base station BS1 and the code error rate of the demodulated signal. When the mobile station MR moves from the radio zone RZ1 to the radio zone RZ2, for example, the mobile station MR detects that the field intensity or the code error rate has deteriorated and is now outside a tolerable range in a step S2. The mobile station MR uses a free time slot which is other than the time slot used by the mobile station MR for the communication with the base station BS1, and successively detects the field intensities of the voice signals or the control signals from each of the neighboring base stations BS2 through BS7 in a step S3, where the control signals have frequencies corresponding to the radio zones RZ2 through RZ7 which are covered by the respective base stations BS2 through BS7. In addition, the mobile station MR determines the highest field intensity among the detected field intensities in a step S4, so as to determine the base station which is to succeed the communication of the base station BS1. In this case, the base station BS2 succeeds the communication of the base station BS1 with the mobile station MR.

The result of the determination made in the step S4 is sent from the mobile station MR to the base station BS1 to request a handover in a step S5. Hence, the base station BS1 which is communicating sends a handover request message to the control station CS in a step S6 in response to the handover request from the mobile station MR. As a result, the handover process becomes possible.

Thereafter, the control station CS selects as the new voice channel the channel for communicating with the new base station BS2 of the radio zone RZ2 in which the mobile station MR is located. In addition, the control station CS notifies the handover message and the new voice channel to the mobile station MR, the base station BS1 which is communicating with the mobile station MR, and the new base station BS2 which is to succeed the communication of the base station BS1. Thereafter, the mobile station MR ends the communication with the base station BS1 and starts a communication with the new base station BS2 using the new voice channel.

Figure 10:
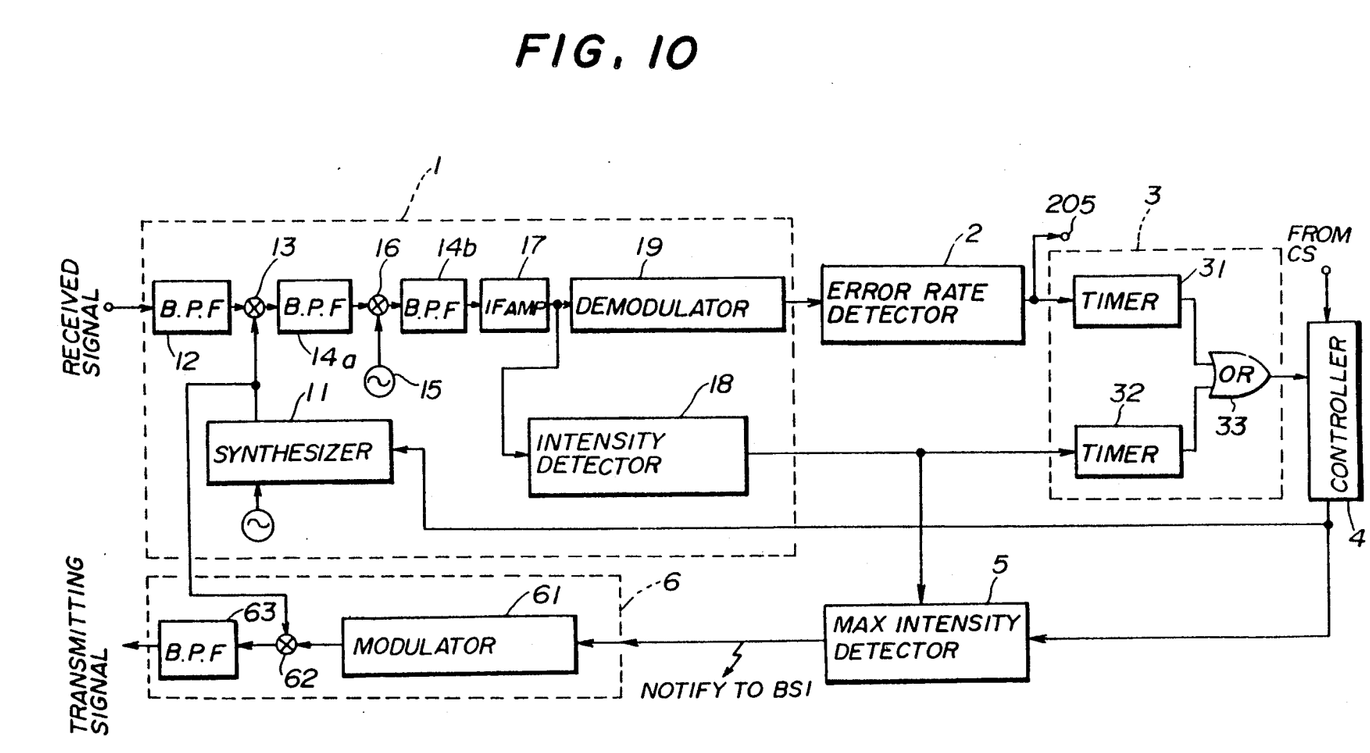
FIG. 10 is a system block diagram showing a receiving system of a mobile station used in an embodiment of the mobile radio communication system according to the present invention.

Next, a description will be given of an embodiment of the mobile radio communication system according to the present invention, by referring to FIG. 10. FIG. 10 shows a receiving system of a mobile station which is used in this embodiment. In FIG. 10, those parts which are the same as those corresponding parts in FIG. 4 are designated by the same reference numerals, and a description thereof will be omitted.

In FIG. 10, a receiver 1 has the same construction as receiver 10 shown in FIG. 4. An error rate detector 2 constantly detects the code error rate of the demodulated signal of the voice channel V-CH which is used for the communication between the mobile station MR and the base station BS, so as to detect the quality of the radio line. A circuit 3 compares the code error rate detected by the error rate detector 2 with a threshold value and compares the field intensity detected by the field intensity detector 18 with a threshold value, and detects a deterioration of the communication quality when the code error rate and the field intensity are less than the respective threshold values for more than a predetermined time. The circuit 3 includes timers 31 and 32, and an OR circuit 33 which are connected as shown.

A controller 4 controls the synthesizer 11 when the deterioration is detected by the circuit 3 or in response to an instruction from the control station CS. A maximum field intensity detector 5 compares the field intensities of the control signals or the voice signals from each of the base stations BS measured by the field intensity detector 18 with a timing with which the controller 4 successively switches the tuning frequency of the synthesizer 11 for the control signal or the voice signal, and detects the base station BS from which the signal having the highest field intensity is received.

A transmitter 6 includes a modulator 61, a mixer 62, and a bandpass filter 63 which are connected as shown. The modulator 61 modulates an output signal of the maximum field intensity detector 5. The mixer 62 mixes an output signal of the modulator 62 and the output signal of the synthesizer 11, and converts the signals into a signal having a desired transmission frequency. The bandpass filter 63 limits the band of the output signal of the mixer 62 into a predetermined band.

For example, the error rate detector 2 may detect the code error rate using the Viterbi code. In this case, the code error rate can be detected by counting the number of times the error correction is made.

Figure 11:
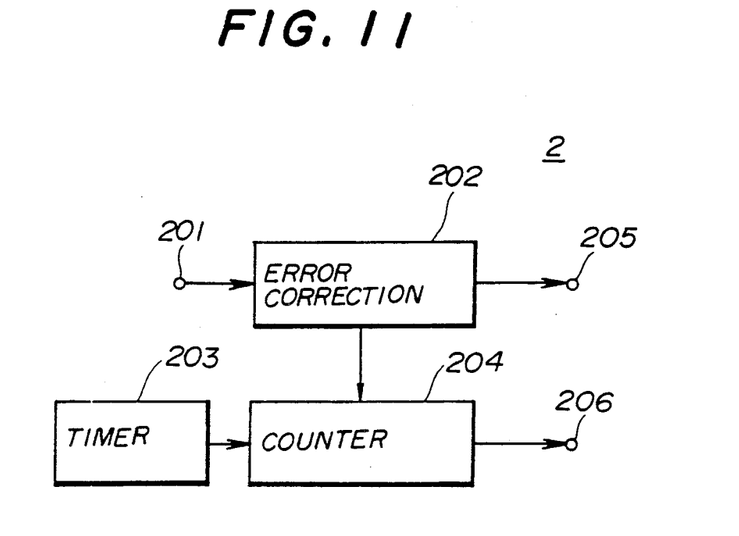
FIG. 11 is a system block diagram showing an embodiment of an error rate detector shown in FIG. 10.

FIG. 11 shows an embodiment of the error rate detector 2. The error rate detector 2 includes an error correction circuit 202, a timer 203 and a counter 204 which are connected as shown. The error correction circuit 202 receives the output of the demodulator 19 shown in FIG. 10 via a terminal 201 and carries out an error correction. A demodulated signal is output from the error correction circuit 202 via a terminal 205. The timer 203 is set with a predetermined time, and the counter 204 counts the number of times the error correction is carried out in the error correction circuit 202 within the predetermined time set in the timer 203. An output signal of the counter 204 is supplied to the timer 31 shown in FIG. 10 via a terminal 206.

Figure 12:
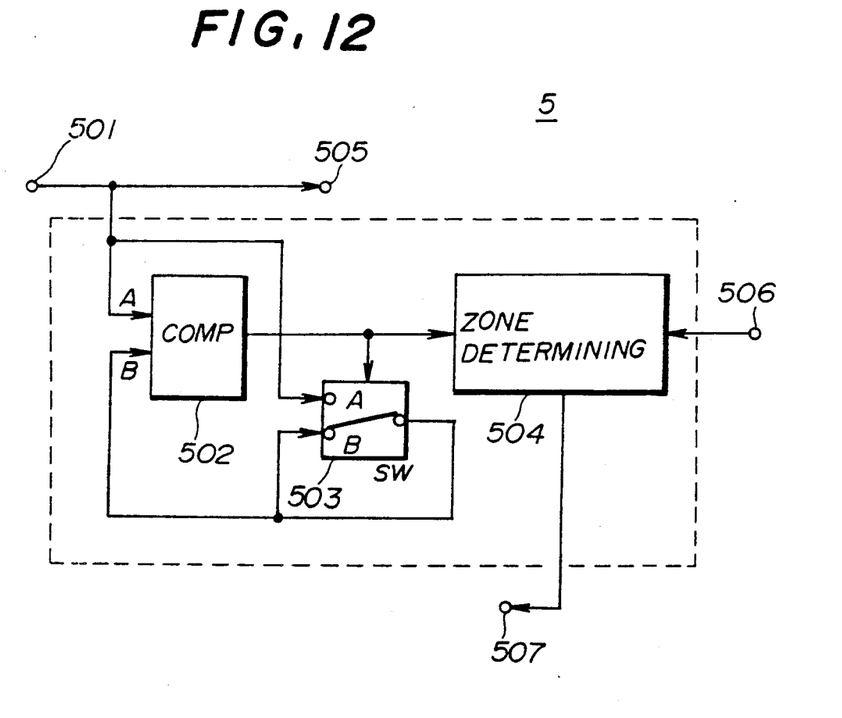
FIG. 12 is a system block diagram showing an embodiment of a maximum field intensity detector shown in FIG. 10.

FIG. 12 shows an embodiment of the maximum field intensity detector 5. The maximum field intensity detector 5 includes a comparator 502, a switch 503 and a zone determining circuit 504 which are connected as shown. The output signal of the field intensity detector 18 shown in FIG. 10 is applied to a terminal 501 and is output from a terminal 505 to be supplied to the timer 32 on one hand, and is supplied to terminals A of the comparator 502 and the switch 503 on the other. An output signal of the switch 503 is supplied to terminals B of the comparator 502 and the switch 503. The comparator 502 compares the magnitude of the field intensity presently detected and received at the terminal A with the magnitude of the field intensity previously detected and received at the terminal B, and outputs a signal which controls the switch 503 to connect to one of the terminals A and B which receives the field intensity with the greater magnitude. The signal from the controller 4 shown in FIG. 10 is supplied to the zone determining circuit 504 via a terminal 506, and the zone determining circuit 504 determines that the base station BS from which the field intensity last supplied to the terminal A originates is the base station BS of the radio zone RZ in which the mobile station MR is now located. An output signal of the zone determining circuit 504 indicative of this determination is supplied to the transmitter 6 shown in FIG. 10 via a terminal 507.

Next, a description will be given of the operation of this embodiment, by referring to FIGS. 6 through 9.

It is assumed for the sake of convenience that the mobile station MR is communicating with the base station BS1 using the time slot "a" of the voice channel V-CH. In this case, when the field intensity and the code error rate respectively detected by the field intensity detector 18 and the error rate detector 2 (step S1) deteriorate to values less than the respective threshold values continuously for the predetermined times set in the respective timers 32 and 31 (step S2), the controller 4 controls the synthesizer 11 based on the output of the OR circuit 33 so as to successively detect the field intensities of the signals from the neighboring base stations BS2 through BS7 (step S3). In other words, the synthesizer 11 uses the time slots "b" and "c" to successively scan the frequencies f2 through f7 of the control signals respectively assigned to the base stations BS2 through BS7.

Depending on the system used, the mobile station MR which corresponds to the control/voice channel C/V-CH of the control signal shown in FIG. 6 may continue to transmit a carrier or a dummy signal even when this mobile station MR is not communicating. In such a case, the field intensities of the control signals assigned to each of the radio zones RZ2 through RZ7 are detected not in the control channel C-CH but in the control/voice channel C/V-CH during the unused time slots "b" and "c".

On the other hand, the mobile station MR may detect the field intensities of the voice signals during the unused time slots "b" and "c" shown in FIG. 7 by successively scanning the voice signals which are assigned to the radio zones RZ2 through RZ7 in the voice channel V-CH, instead of detecting the field intensities of the control signals shown in FIG. 6.

In other words, during the time slots "b" and "c" which are unused by the mobile station MR, the frequency groups f9 through f14 of the voice channels V-CH of the voice signals which are assigned to each of the base stations BS2 through BS7 are successively scanned to determine which one of the signals from the base stations BS2 through BS7 has the highest field intensity based on the field intensities of the frequency groups f9 through f14, because at least the dummy signal is transmitted from the base stations BS2 through BS7 during the time slots "b" and "c".

However, the dummy signal in the voice channel V-CH is not transmitted if none of the voice channels V-CH are used. Hence, the detection of the signal in the voice channel V-CH is different from the detection of the control signal in the control channel C-CH in that the control signal is constantly transmitted in the control channel C-CH.

As a result of the detection described above, the mobile station MR detects that the mobile station MR is located within the radio zone RZ of the base station BS from which the signal having the highest field intensity is detected (step S4). When it is assumed for the sake of convenience that the signal having the highest field intensity is received from the base station BS2, it is detected that the mobile station MR is located within the radio zone RZ2. In this case, the mobile station MR notifies the base station BS1 that the signal from the base station BS1 is becoming weak and the strongest signal is received from the base station BS2 using the control signal included in the voice channel V-CH (step S5).

The mobile station MR may receive the correspondence of each frequency and the base stations BS2 through BS7 in advance from the base stations BS2 through BS7 using the control channel C-CH when the communication starts, or during the communication using the control signal included in the voice channel V-CH. In this case, the information related to the base station BS2 which corresponds to the radio zone RZ2 in which the frequency of the signal having the highest field intensity is used may be notified from the mobile station MR to the base station BS1. On the other hand, when the correspondence of the frequencies and the base stations BS2 through BS7 is unknown at the mobile station MR, the mobile station MR may notify to the base station BS1 the frequency of the signal which is detected as having the highest field intensity, so that the base station BS1 may detect which base station BS corresponds to the detected frequency.

If the signal from the base station BS2 has the highest field intensity, the base station BS1 notifies the control station CS of this information (step S6). Then, the control station CS selects as the new voice channel V-CH a free channel out of the voice channel group f9 which is assigned to the base station BS2 (step S17).

In addition, the control station CS notifies the handover message and the new voice channel V-CH to the base stations BS1 and BS2 (step S18), and the base station BS1 responsive thereto notifies the handover message and the new voice channel V-CH to the mobile station MR (step S19).

Accordingly, the mobile station MR ends the communication with the base station BS1 and hands off the communication to the base station BS2 so as to start a communication with the base station BS2 using the new voice channel V-CH, and the handover control is completed.

Further, the present invention is not limited to these embodiments, but various variations and modifications may be made without departing from the scope of the present invention.

What is claimed is:

1. A mobile radio communication system comprising:
   a control station which is provided with respect to a control zone, said control zone being made up of a plurality of radio zones;
   a base station which is provided with respect to each of the radio zones; and
   a mobile station which is movable within the control zone,
   said mobile station including first means for constantly monitoring a quality of a radio line between said mobile station and a first base station with which said mobile station is presently communicating, said first base station being provided with respect to a first radio zone, second means coupled to said first means for detecting a deterioration of the quality of the radio line between said mobile station and said first base station outside a tolerable range, third means coupled to said first means for successively detecting field intensities of signals received from the base stations neighboring said first base station using a free time slot which is unused by said mobile station for communication and for determining a maximum field intensity, fourth means coupled to said third means for supplying to said first base station predetermined information related to a second base station from which the signal with the maximum field intensity is received so as to make a handover request, and fifth means for ending the communication with said first base station in response to a handover message, said second base station being provided with respect to a second radio zone which is different from said first radio zone,
   said first base station including means for supplying a handover request message to said control station in response to the handover request from said mobile station,
   said control station including means for carrying out a handover process in response to the handover request message, said handover process including selecting a new communication channel with which said mobile station is to communicate with said second base station when said mobile station moves from said first radio zone to said second radio zone, and notifying the handover message and the new communication channel to said mobile station and said first and second base stations, so that said mobile station ends the communication with said first base station in response to the handover message and starts a communication with said second base station using the new communication channel.

2. The mobile radio communication system as claimed in claim 1, wherein mutually different first frequency groups are assigned to said radio zones for a control signal which is used for controlling call-out and call-in on a radio line, and mutually different second frequency groups are assigned to said radio zones for a communication signal which is used for the communication, said first and second frequency groups including no overlapping frequencies within said control zone, said control signal and said communication signal respectively being transmitted time-divisionally in time slots in conformance with a time division multiplexing access system.

3. The mobile radio communication system as claimed in claim 2, wherein said predetermined information includes the frequency of the signal which is detected by said third means as having the maximum field intensity.

4. The mobile radio communication system as claimed in claim 2, wherein said third means detects the intensities of the signals received from the neighboring base stations by successively scanning control channels which correspond to the first frequency groups.

5. The mobile radio communication system as claimed in claim 4, wherein said neighboring base stations constantly transmit carriers in the control channels, so that said third means can successively detect the field intensities of the signals in the control channels during free time slots other than the time slot used by said mobile station.

6. The mobile radio communication system as claimed in claim 2, wherein said third means detects the intensities of the signals received from the neighboring base stations by successively scanning communication channels which correspond to the second frequency groups.

7. The mobile radio communication system as claimed in claim 6, wherein said neighboring base stations constantly transmit carriers in the communication channels, so that said third means can successively detect the field intensities of the signals in the communication channels during free time slots other than the time slot used by said mobile station.

8. The mobile radio communication system as claimed in claim 1, wherein said mobile station receives, prior to a start of the communication, specific information related to correspondence of frequencies and the base stations which are provided with respect to the radio zones assigned with the frequencies.

9. The mobile radio communication system as claimed in claim 8, wherein said mobile station receives the specific information using a control channel which corresponds to one of the first frequency groups.

10. The mobile radio communication system as claimed in claim 1, wherein said mobile station receives during a communication specific information related to correspondence of frequencies and the base stations which are provided with respect to the radio zones assigned with the frequencies.

11. The mobile radio communication system as claimed in claim 10, wherein said mobile station receives the specific information using the communication channel which corresponds to one of the second frequency groups.

12. The mobile radio communication system as claimed in claim 1, wherein said second means includes monitoring means for monitoring a field intensity of a signal received from said first base station and a code error rate of a demodulated signal which is obtained by demodulation of the signal received from said first base station, and detecting means for detecting the deterioration of the quality of the radio line when at least one of the monitored field intensity and code error rate becomes less than a corresponding threshold value continuously for a predetermined time.

13. The mobile radio communication system as claimed in claim 12, wherein said monitoring means monitors the code error rate by detecting a number of times an error correction is made with respect to demodulated signal within a given time.

* * * * *

UNITED STATES PATENT AND TRADEMARK OFFICE
CERTIFICATE OF CORRECTION

PATENT NO. : 5,117,502

DATED : May 26, 1992

INVENTOR(S) : Masahiro ONODA et al.

It is certified that error appears in the above-identified patent and that said Letters Patent is hereby corrected as shown below:

Item [57] ABSTRACT:

line 23, change "communication" to --communicate--.

Col. 1, line 10, change "are" to --is an--;

Col. 6, line 24, delete "of".

Signed and Sealed this

Sixteenth Day of November, 1993

Attest:

BRUCE LEHMAN

Attesting Officer　　　Commissioner of Patents and Trademarks